US005695634A

United States Patent [19]

Neuenfeldt et al.

[11] Patent Number: 5,695,634
[45] Date of Patent: Dec. 9, 1997

[54] PROCESS FOR CATALYTIC TREATMENT OF WASTE WATER AS WELL AS A PROCESS FOR REGENERATING A CATALYST

[75] Inventors: Gerhard Neuenfeldt, Estorf; Alfred Ottmann, Hannover; Hubert Schindler, Uetze, all of Germany

[73] Assignee: Solvay Deutschland GmbH

[21] Appl. No.: 397,685

[22] Filed: Mar. 1, 1995

[30] Foreign Application Priority Data

Mar. 1, 1994 [DE] Germany ............... 44 06 588.4

[51] Int. Cl.[6] ................................................. C02F 1/70
[52] U.S. Cl. ........................... 210/757; 210/908; 210/909; 502/27; 502/33; 502/56
[58] Field of Search ..................... 502/27, 28, 29, 502/31, 33, 56; 210/757, 908, 909

[56] References Cited

U.S. PATENT DOCUMENTS

| 3,090,816 | 5/1963 | Deafon ................... 502/33 |
| 3,660,306 | 5/1972 | Sennewald et al. .......... 502/27 |
| 4,120,819 | 10/1978 | Small ..................... 502/27 |
| 4,717,696 | 1/1988 | Arena ..................... 502/27 |
| 4,758,346 | 7/1988 | Johnson .................. 210/757 |
| 4,822,760 | 4/1989 | Kashibe et al. |
| 4,999,326 | 3/1991 | Sikkenga et al. ............ 502/33 |

FOREIGN PATENT DOCUMENTS

| 467053 | 1/1992 | European Pat. Off. |
| 2420374 | 4/1973 | Germany ................... 502/27 |
| 102943 | 6/1985 | Japan ..................... 502/33 |
| 132652 | 7/1985 | Japan ..................... 502/33 |
| 11150 | 1/1986 | Japan ..................... 502/27 |
| 13542 | 1/1987 | Japan ..................... 502/27 |
| 282645 | 12/1987 | Japan ..................... 502/33 |
| 299236 | 12/1989 | Japan ..................... 502/27 |
| 131136 | 5/1992 | Japan ..................... 502/33 |
| WO 91/04097 | 4/1991 | WIPO. |
| WO 94/20423 | 9/1994 | WIPO. |

OTHER PUBLICATIONS

Abstract of Japanese Patent Application No. JP 60–102,943.

Primary Examiner—Neil McCarthy
Attorney, Agent, or Firm—Evenson, McKeown, Edwards & Lenahan P.L.L.C.

[57] ABSTRACT

A process for regenerating a supported noble metal catalyst and also a process for catalytic treatment of wastewater containing, in particular, organohalogen contaminants, in which the process for regenerating the catalyst is a part of the overall wastewater treatment process.

20 Claims, No Drawings

PROCESS FOR CATALYTIC TREATMENT OF WASTE WATER AS WELL AS A PROCESS FOR REGENERATING A CATALYST

BACKGROUND OF THE INVENTION

This invention relates to a process for catalytic treatment of wastewater containing organohalogen, in particular organochlorine, compounds and also a process for regenerating the catalyst.

Various processes and methods are known for purifying wastewater containing organohalogen, in particular organochlorine, compounds. For example:
- wet oxidative incineration
- biological treatment
- treatment with ozone
- thermal-alkaline treatment
- catalytic treatment.

The known processes for catalytically treating wastewater containing, in particular, organochlorine compounds use, for example, alkali metal or alkaline earth metal compounds or noble metals or noble metal compounds as catalysts. Thus, it is known that the dechlorination of the organochlorine compounds present in the wastewater is very successful in the presence of platinum, palladium or rhodium, with palladium having the greatest activity. Further studies have shown that the effect on the catalyst activity of the selection of the support material should not be underestimated. It is thus known that palladium supported on aluminum oxide has a lower activity than palladium supported on carbon. It is also known that in the catalytic dechlorination of organochlorine compounds, the activity of a carbon-supported palladium catalyst drops off after a prolonged treatment time. The known method of restoring the original activity of the catalyst by washing with ammonium hydroxide fails, however, if industrial wastewater is to be treated which contains organic and inorganic compounds in addition to the organochlorine compounds.

Published European Patent Application No. EP 467,053 proposes regenerating a supported alkali metal catalyst by rinsing the catalyst successively with an inert solvent, preferably hexane, a lower alcohol and, optionally, with water and then drying it. However, this process does not work for supported noble metal catalysts.

SUMMARY OF THE INVENTION

It is an object of the invention to maintain the activity of noble metal catalysts over a long period of time with the continuous method of operation of the catalytic wastewater treatment being retained.

According to the invention, the supported noble metal catalyst is treated with an organic solvent, solvent mixture or solvent/acid mixture and/or first with solvent and/or subsequently with acid and/or thermally.

In order to ensure continuous wastewater treatment, it has been found to be advantageous to install at least two reactors charged with catalyst, with these reactors being arranged in such a way that they are alternately available for the dehalogenation of the wastewater or for the regeneration of the catalyst.

According to the invention, known supported noble metal catalysts can be regenerated which are used particularly for catalytically treating wastewater.

The noble metals used may be metals of transition group VIII of the Periodic Table of Elements, e.g. platinum, palladium, iridium or rhodium, preferably palladium, alone or in combination with one another.

In principle, it is possible to use any conventional inert, in particular ceramic, support materials which are used in catalysis.

Oxides are preferred, e.g. of aluminum, magnesium, zirconium, silicon, titanium, or carbides, e.g. silicon carbide, or combinations of these materials.

Other known inert support materials which can be used include carbon or combinations of carbon with the aforementioned oxides and/or carbides in powder form or as shaped bodies.

In one preferred embodiment, a combination of an oxide with carbon is used as support material. Combinations in which the oxide content is at least 50% by weight of the support have been found to be particularly advantageous.

In a preferred variant, noble metal catalysts based on a support prepared by sol-gel processes and containing inorganic oxides, in particular silicon dioxide, and carbon are used and regenerated for the wastewater treatment of the invention.

It is preferred to use a catalyst whose support has been prepared by converting a sol into droplet-shaped sol particles by spraying the sol particles from below into a reaction gas, collecting the sol particles in the reaction liquid after they have flown through a curved trajectory and subsequently working up the solidified sol particles by ageing, washing, drying and calcining, where the sol is prepared by first combining inorganic oxides and an alkaline component, e.g. carbon, with a liquid acid component to give a sol and then spraying this.

The supported catalysts based on sol-gel supports have the advantage that they have high uniformity, both with regard to their external shape and in respect of the material quality. Furthermore, they also have a high mechanical stability.

The supported catalysts are prepared in a known manner by impregnating the supports with an aqueous solution of the metal compounds and subsequently drying and calcining.

The catalyst can be regenerated either within the reactor or outside the reactor. In one preferred embodiment of the process, the catalyst is regenerated in the reactor by switching over the process streams.

In one particularly preferred embodiment, the process of the invention for regenerating the spent catalyst is part of a process for catalytically treating wastewater. In this process the wastewater having a pH of from 3 to 10, preferably from 4 to 6, is introduced into at least one reactor in which the supported noble metal catalyst is located, and treated with hydrogen at from 1 to 10 bar and at from 5° to 80° C., preferably from 10° to 30° C.

The catalytic treatment can be carried out either in a fixed-bed, a fluidized-bed or a stirred reactor.

The hydrogen can be introduced either by direct introduction or by introduction through a membrane module. Membranes having an integral symmetric construction and, in particular, composite membranes are particularly suitable. These membranes possess a porous, water-resistant support structure and at least one layer of water-resistant, pore-free polymer past which the wastewater to be gassed is conducted. This pore-free layer comprises, for example, silicone polymer. Other methods, e.g. via gas saturators, are likewise suitable for the introduction of $H_2$.

The hydrogen can be introduced either simultaneously with or separately from the contacting of the wastewater with the catalyst. Advantageously, the hydrogen is introduced before the wastewater comes into contact with the catalyst.

Of course, the treatment temperature, the residence time and the pH of the wastewater to be dehalogenated are to be matched to the respective constituents. For example, in treating wastewater from the synthesis of epichlorohydrin it has been found to be advantageous to regenerate the catalyst after a treatment time of about 4 to 8 hours. Thus, to ensure a consistently good effect of the process, the introduction of wastewater into the reactor is interrupted after a predetermined treatment time, which depends on the constituents of the water, and the catalyst is washed with an organic solvent, e.g. with polar organic solvents such as ketones, alcohols, ethers, preferably acetone or a solvent mixture. In another embodiment of the invention, a solvent/acid mixture, preferably in a solvent:acid ratio of 50% by volume:50% by volume can be used for flushing in place of the organic solvent or solvent mixture, or a separate treatment with acid can be carried out after the washing with solvent or solvent mixture. The acid used is, for example, an acid having a pH of <3, preferably hydrochloric acid. The treatment with solvent or solvent mixture and also the acid treatment can be carried out at room temperature.

It is likewise possible to carry out an acid treatment prior to the washing with solvent or with solvent mixtures.

A combination with a subsequent thermal treatment is likewise possible; the thermal treatment being preferably carried out at a temperature of at least 500° C. However, in such a case it is also generally necessary to subsequently reactivate the catalyst by known methods, e.g. by treatment with borohydride solutions.

It is likewise possible to subject the catalyst only to a thermal treatment followed by subsequent reactivation. It is similarly possible to initially wash the catalyst with acid and subsequently treat it thermally or to carry out the thermal treatment before the acid treatment.

It has been found to be advantageous to carry out the thermal treatment at a temperature of at least 500° C.

It has also been found to be advantageous to adhere to a regeneration interval of about 7 hours to maintain the catalyst activity for more than 100 hours, with the amount of the water constituents having a determining effect on the time interval between regenerations.

By means of this continuous alternation between dehydrochlorination and regeneration it is possible to successfully purify wastewater containing inorganic ions, e.g. sulfates, chlorides, fluorides, phosphates, in addition to the organic contaminants.

The following examples are intended to illustrate the invention without limiting its scope.

EXAMPLE 1

A two-column fixed-bed apparatus contained 200 gram of catalyst in each reactor column. The catalyst support comprised 60% by weight silicon dioxide and 40% by weight carbon and had a particle size of from 400 to 600 μm. 1% by weight of Pd were applied to this support. In this apparatus, wastewater from the synthesis of epichlorohydrin, whose pH had been adjusted to 4.5, was first saturated with hydrogen gas and subsequently catalytically dehalogenated at ambient temperature and a first-column pressure of 4 bar. Before the treatment, the wastewater had an AOX content of 20 mg/l; after the treatment the wastewater had an AOX content of less than 2 mg/l. The catalyst activity can be maintained for more than 130 hours at a throughput of 10 liters/hour by regenerating the catalyst by washing first with at least 0.5 liter of acetone and subsequently with at least 0.5 liter of hydrochloric acid (pH=3). The apparatus was used in such a way that while the reaction was being carried out in one catalyst bed, the other catalyst bed was regenerated, with a regeneration interval of 7 hours being adhered to.

EXAMPLE 2

A continuous stirred-tank reactor contained 1 gram of catalyst similar to that in Example 1 but having a particle size of less than 100 μm. In this apparatus, wastewater from the synthesis of epichlorohydrin, whose pH had been adjusted to 4.5, was catalytically treated at atmospheric pressure and ambient temperature. The liquid volume in the reactor was 300 ml. The throughput was adjusted to 120 ml/hour. The stirring speed was 880 rpm. At least 0.5 liters/hour of hydrogen gas flowed from a G4 frit through the liquid. Before the treatment, the wastewater had an AOX content of between 19.3 and 24.5 mg/liter. After the catalytic treatment, the wastewater had an AOX content of less than 2 mg/liter. The catalytic activity could be maintained for more than 140 hours by regenerating the catalyst by washing first with at least 10 ml of acetone and subsequently with at least 10 ml of hydrochloric acid (pH 3), with a regeneration interval of 6 hours being adhered to.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for regenerating a supported noble metal catalyst that has been used for the reductive treatment of waste water containing at least one organohalogen compound at from 5° to 80° C., wherein said catalyst comprises palladium metal supported on a support material selected from the group consisting of inorganic oxides, inorganic carbides, mixtures of inorganic oxide and carbide, and mixtures of any of the foregoing with carbon; said process comprising
    removing deactivating components from the catalyst by
        (1) subjecting the catalyst to at least one regeneration treatment selected from the group consisting of
            treating the catalyst with a polar organic solvent; and
            treating the catalyst with an acid having pK of less than 3; and
        (2) subjecting the treated catalyst to a heating treatment.

2. A process according to claim 1, wherein the catalyst is treated with an organic solvent or solvent mixture.

3. A process according to claim 1, wherein the catalyst is treated with a mixture of an acid and an organic solvent or solvent mixture.

4. A process according to claim 1, wherein the catalyst is treated with an organic solvent or solvent mixture and subsequently with acid.

5. A process according to claim 1, wherein the catalyst is treated with acid and subsequently with an organic solvent or solvent mixture.

6. A process according to claim 1, wherein the catalyst is heated to a temperature of at least 500° C.

7. A process according to claim 6, wherein the catalyst is subsequently subjected to a reactivating treatment.

8. A process according to claim 1, wherein the catalyst is treated with acid and subsequently is heated at a temperature of at least 500° C.

9. A process according to claim 1, wherein the catalyst is heated at a temperature of at least 500° C. and subsequently treated with acid.

10. A process according to claim 1, wherein the catalyst is treated with a polar organic solvent selected from the group consisting of ketones, alcohols, and ethers.

11. A process according to claim 10, wherein the catalyst is treated with acetone.

12. A process according to claim 1, wherein the catalyst is treated with hydrochloric acid.

13. A process according to claim 1, wherein said regeneration treatment is carried out at room temperature.

14. A process for treating wastewater containing at least one organohalogen compound said process comprising:

subjecting the wastewater to catalytic treatment at from 5° to 80° C. in the presence of hydrogen in at least one reactor containing a supported noble metal catalyst, whereby said wastewater is dehalogenated and at least one substance is formed which deactivates the noble metal catalyst; and periodically interrupting said catalytic treatment and regenerating deactivated noble metal catalyst by
(1) subjecting the catalyst to at least one regeneration treatment selected from the group consisting of treating the catalyst with a polar organic solvent; and treating the catalyst with an acid having a pK of less than 3; and
(2) subjecting the treated catalyst to a heating treatment, whereby the at least one deactivating substance is removed.

15. A process according to claim 14, wherein said organohalogen compound is an organochlorine compound.

16. A process according to claim 14, wherein wastewater having a pH of from 3 to 10, is treated with hydrogen in the presence of the supported noble metal catalyst at from 1 to 10 bar.

17. A process according to claim 16, wherein wastewater having a pH of from 4 to 6, is treated with hydrogen at a temperature of from 10° to 30° C.

18. A process according to claim 14, wherein the noble metal catalyst is a palladium catalyst carried on a support prepared by a sol-gel process.

19. A process according to claim 14, wherein the noble metal catalyst further comprises a substance selected from the group consisting of oxides, carbides, mixtures of oxide and carbide, and mixtures of one or more of the foregoing with carbon.

20. A process according to claim 19, wherein the noble metal catalyst comprises a substance selected from the group consisting of aluminum oxide, magnesium oxide, zirconium oxide, silicon oxide, silicon carbide and mixtures of two or more of the foregoing with carbon.

* * * * *